United States Patent
Celi, Jr. et al.

(10) Patent No.: US 7,103,156 B2
(45) Date of Patent: Sep. 5, 2006

(54) TELEPHONY VOICE SERVER

(75) Inventors: Joseph Celi, Jr., Boca Raton, FL (US); Thomas E. Creamer, Boca Raton, FL (US); Victor S. Moore, Boynton Beach, FL (US); Scott L. Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 10/310,238

(22) Filed: Dec. 4, 2002

(65) Prior Publication Data

US 2004/0109541 A1   Jun. 10, 2004

(51) Int. Cl.
*H04M 1/64* (2006.01)
*H04M 11/00* (2006.01)
*G06F 15/16* (2006.01)

(52) U.S. Cl. .............................. 379/88.14; 379/88.16; 379/88.17; 379/88.23; 379/88.27; 379/93.25; 709/217

(58) Field of Classification Search ................ 704/270, 704/270.1, 275; 379/88.02, 88, 201, 88.17; 709/204

See application file for complete search history.

(56) References Cited

U.S. PATENT DOCUMENTS

| | | | |
|---|---|---|---|
| 5,583,920 A * | 12/1996 | Wheeler, Jr. .............. 379/88.01 |
| 5,594,784 A | 1/1997 | Velius ......................... 379/88 |
| 5,652,789 A * | 7/1997 | Miner et al. ............ 379/201.01 |
| 5,884,262 A * | 3/1999 | Wise et al. ............... 704/270.1 |
| 5,999,611 A | 12/1999 | Tatchell et al. .............. 379/211 |
| 6,044,133 A | 3/2000 | Furukawa et al. ........ 379/88.01 |
| 6,154,644 A | 11/2000 | Murray .......................... 455/414 |
| 6,163,535 A | 12/2000 | Jordan et al. ................ 370/352 |
| 6,208,970 B1 * | 3/2001 | Ramanan ..................... 704/270 |
| 6,292,478 B1 | 9/2001 | Farris .......................... 370/352 |
| 6,654,722 B1 * | 11/2003 | Aldous et al. ............ 704/270.1 |
| 6,798,867 B1 * | 9/2004 | Zirngibl et al. ........... 379/88.17 |
| 6,993,120 B1 * | 1/2006 | Brown et al. ............. 379/88.13 |
| 7,003,286 B1 * | 2/2006 | Brown et al. ............... 455/416 |
| 2002/0150082 A1 * | 10/2002 | Celi, Jr. ...................... 370/352 |
| 2003/0083882 A1 * | 5/2003 | Schemers, III et al. .. 704/270.1 |

* cited by examiner

*Primary Examiner*—Fan Tsang
*Assistant Examiner*—Lisa Hashem
(74) *Attorney, Agent, or Firm*—Akerman-Senterfitt

(57) ABSTRACT

A voice server for hosting telephony services can include a stack interface configured to exchange telephony signaling information with a circuit-switched to packet-switched interface and a plurality of core clients, each having a call model stored therein. Each core client can be configured to select and execute at least one voice service associated with a call. The voice server further can include a speech processing system configured to convert speech to text and to convert text to speech for processing the call as well as a core processor. The core processor can be configured to distribute the telephony signaling information to the core clients and coordinate operation of the core clients and the speech processing system. The core processor also can exchange telephony signaling information with the circuit-switched to packet-switched interface via the stack interface.

27 Claims, 3 Drawing Sheets

TELEPHONY VOICE SERVER

BACKGROUND OF THE INVENTION

1. Technical Field

The invention relates to the field of telecommunications and, more particularly, to an architecture for providing voice services in or to a telecommunications network.

2. Description of the Related Art

Telecommunication companies continually create new telephony services and/or features (hereafter "voice services") to be offered to subscribers. Voice services are a blend of voice processing technology, call control, and enterprise applications. Voice processing technology is used to recognize both spoken inputs and touch tone inputs from users over a telecommunication link. These inputs direct how a user call is to be handled by the voice service. The inputs also can determine whether a call will be and subsequently is provided to one or more enterprise applications.

Voice servers implement interactive voice response technology with telephony call control. A voice server can execute voice services which can interact with a caller and also redirect calls responsive to user inputs. Accordingly, many businesses rely upon these solutions to direct incoming calls to various locations within an office. Similar to conventional voice response unit (VRU) type systems, more sophisticated voice server solutions can incorporate enterprise data. For example, an inbound call to an employee can be redirected automatically to a telephone number listed in the electronic calendar of the employee.

Although voice servers mark a significant improvement over VRU technology, still, conventional voice servers do have disadvantages. Conventional voice servers utilize an architecture wherein high bandwidth data such as speech is routed throughout the voice server, including to voice and telephony services, thereby requiring the voice server to handle a significant amount of bandwidth throughout the internal communication channels of the voice server. For example, conventional voice servers utilize an architecture which includes a core processor that interacts with a core client. The core client serves as an interface to one or more telephony services. Within such voice server architectures, high bandwidth data typically is routed between the core client and the core processor. The significant amount of bandwidth necessary to route speech data throughout the voice server can place a heavy load on the voice server.

Another disadvantage of conventional voice servers is that such systems are commonly viewed as a single entity comprised of both the voice processing hardware and software components. In consequence, conventional voice servers locate both telephony services and call control including signal routing within the same software component. As a voice processing system expands beyond a single voice server, each added voice server implements and supports its own individual and single call model, resulting in multiple call models. An expanded system architecture of multiple voice servers, however, can become less reliable as the system is unlikely to function as expected, that is as a single, unified entity.

Another disadvantage of conventional voice server architectures, is that the core processor includes the call model. This configuration can reduce operational efficiency as well as complicate expandability of the voice server. More particularly, when multiple core clients are introduced into the voice server, complex call model and communication facilities must be included in the voice server architecture to coordinate and manage the core clients and other components of the voice server.

SUMMARY OF THE INVENTION

The invention disclosed herein provides a voice server architecture which provides improved call handling ability and improved scalability over conventional voice servers. The present invention routes high bandwidth data such as speech within the voice server in such a way as to minimize needed bandwidth. Additionally, the core clients can include the call model, while the core processor can include lookup services and/or lookup functionality. Service creation also can be improved by providing for an interface between the service logic and the core client.

One aspect of the present invention can include a voice server for hosting telephony services. The voice server can include a stack interface configured to exchange telephony signaling information with a circuit-switched to packet-switched interface. One or more core clients, each having a call model stored therein, can be included, wherein each of the core clients is configured to select and execute at least one voice service associated with a call. The call model disposed in the core clients can include an inbound call model and an outbound call model. According to another embodiment of the present invention, the core clients can include an application programming interface for communicating with the voice services. Notably, each core client can be associated with a virtual machine within which the one or more voice services can execute. The voice server can include a speech processing system configured to convert speech to text and to convert text to speech for processing the call.

The voice server also can include a core processor. The core processor can be configured to distribute the telephony signaling information to the core clients and coordinate operation of the core clients and the speech processing system. The core processor further can exchange telephony signaling information with the circuit-switched to packet-switched interface via the stack interface. Additionally, the core processor can be configured to perform lookup services.

Notably, according to the present invention, audio information within the voice server is routed to and from the speech processing system without being provided or routed to the core processor or the core clients. Also, the core clients, the speech processing system, and the core processor can communicate with one another via a packet-switched communications network.

The voice server can include an application programming interface to the speech processing system through which the core processor can interact with the speech processing system and through which the speech processing system can exchange text with the voice services via the core clients. The speech processing system can include a speech recognition system and a text-to-speech system. Notably, the speech processing system also can process dual tone multi-frequency signals.

If the speech processing system includes a speech recognition system and a text-to-speech system, the voice server can include an application programming interface through which the core processor interacts with the speech recognition system and through which the speech recognition system exchanges text with the voice services via the core clients. Another application programming interface through which the core processor interacts with the text-to-speech system and through which the text-to-speech system exchanges text with the voice services via the core clients can be included.

According to one embodiment of the present invention, the voice server can include at least one real-time streaming engine configured to convert audio data between a streamed audio format and a packetized data format for exchanging the audio data between the speech processing system and the circuit-switched to packet-switched interface. According to another embodiment of the present invention, two real-time streaming engines can be included. For example, a real-time streaming engine configured to convert streamed audio from the circuit-switched to packet-switched interface to packetized data to be provided to the speech recognition engine can be included as well as a second real-time streaming engine configured to convert packetized data from the text-to-speech processor to streamed audio to be provided to the circuit-switched to packet-switched interface.

The voice server of the present invention also can include a data store which associates voice services with the telephony signaling information, wherein each association of telephony signaling information with a voice service further specifies voice server resources required for implementing the voice service. The telephony signaling information can specify at least a called number and a calling number such that the core processor can access the data store to determine at least one voice service associated with the call and resources associated with the voice service. The core processor can be configured to determine an available one of the core clients and to provide to the available one of the core clients the called number, the calling number, the determined voice services, and the determined voice server resources associated with the call.

The stack interface can include one or more stack interfaces for exchanging telephony signaling information. Each of the stack interfaces can be dedicated to a particular telephony protocol. A consolidation processor can be included for coordinating communications between the core processor and the stacks. For example, the consolidation processor can be configured to read telephony signaling information from each of the stack interfaces and provide the telephony signaling information to the core processor. The consolidation processor further can be configured to receive telephony signaling information from the core processor and distribute the telephony signaling information to an appropriate one of the stack interfaces.

Another aspect of the present invention can include a method of processing calls within a voice server. The method can include identifying, within a core processor of the voice server, telephony signaling information for a call. The core processor can perform a lookup function with the telephony signaling information to determine voice services for processing the call. The telephony signaling information can be provided to a core client within the voice server. Notably, the core client can have a call model stored therein. The core client can use the received telephony signaling information to retrieve a voice service associated with the call. Accordingly, the core client can execute the voice service to process the call according to the executing voice service and the call model. In processing the call, the core client can exchange textual information with the speech processing system such that the core client does not receive or process an audio channel.

The method also can include receiving the call within a circuit switched to packet switched telephony interface and separating audio information of the call from telephony signaling information for the call. Audio information from the call can be formatted as streaming audio and can be provided to a speech recognition engine to convert the audio information to text to be provided to the executing voice service.

The telephony signaling information to be provided to the core processor can be placed on a telephony stack. Notably, telephony signaling information to be provided to the core processor can be placed on at least one of several telephony stacks, wherein each telephony stack corresponds to a particular messaging protocol. The telephony signaling information can be selectively provided to the core processor from one of the telephony stacks. The voice service also can provide playback text to a text-to-speech engine for playback. Accordingly, the playback text can be converted to speech. The speech can be formatted as streaming audio and can be provided to the circuit switched to packet switched telephony interface for playback over the call.

Another aspect of the present invention can include a method of processing calls within a voice server which includes executing a telephony voice service, and within the voice server, receiving audio over an established telecommunications link. The audio can be routed to a speech recognition engine for conversion to speech recognized text and can be provided to the telephony voice service for processing. The telephony voice service can determine text for playback and can provide the playback text to a text-to-speech engine for playback over the telecommunications link, such that audio is not processed by the telephony voice service.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a voice server architecture, which provides improved call handling ability and improved scalability over conventional voice servers. In particular, the present invention provides a voice server which partitions voice services into four primary parts: network stacks, speech processing resources, a core processor, and core clients. In accordance with the inventive arrangements disclosed herein, high bandwidth data such as speech is not routed to the core clients. Additionally, the core processor can include lookup services while the call models can be included within the core clients.

Figure 1:
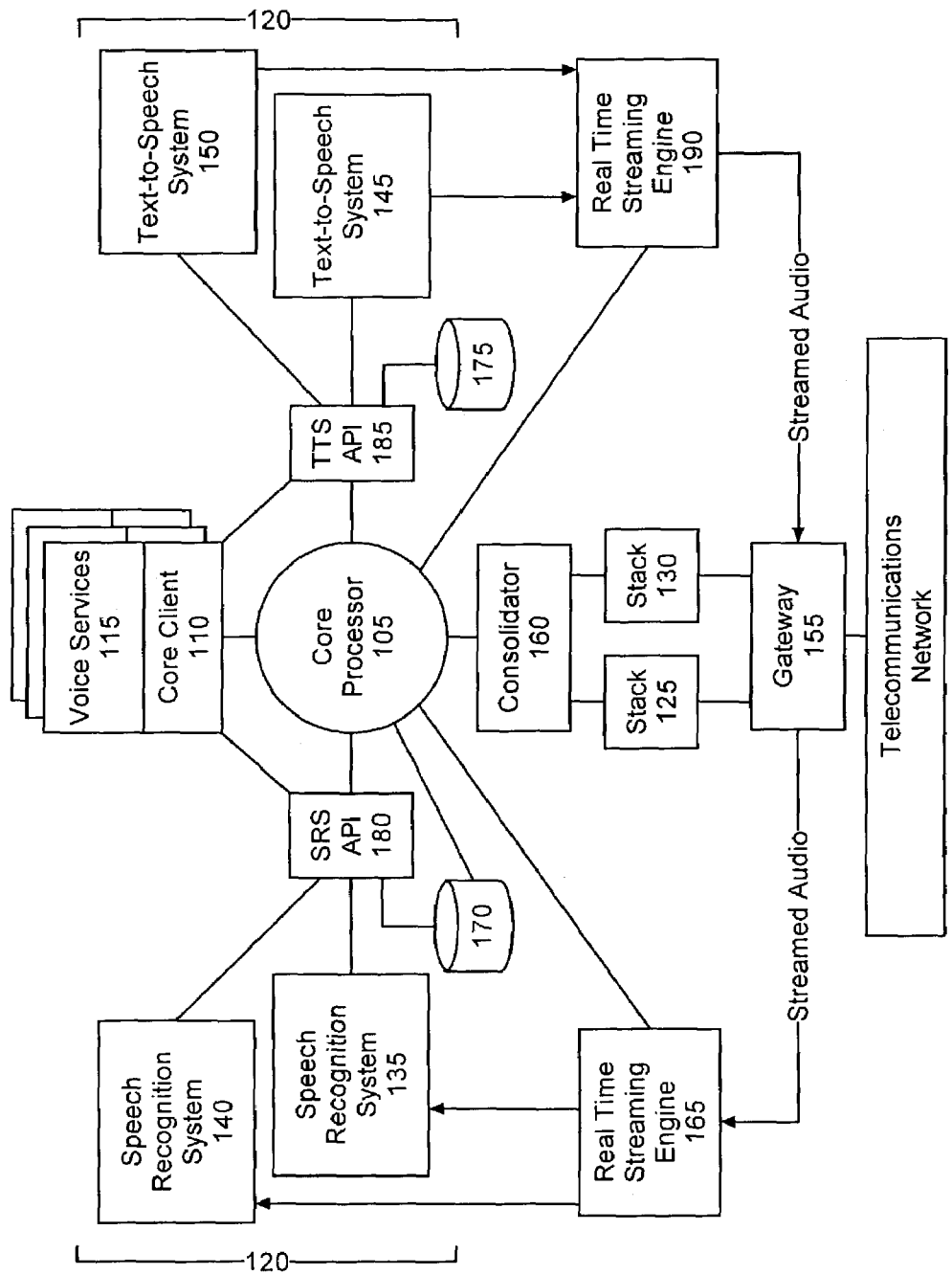
FIG. 1 is a schematic diagram illustrating a voice server configured in accordance with the inventive arrangements disclosed herein.

FIG. 1 is a schematic diagram illustrating an architecture of a voice server 100 configured in accordance with the inventive arrangements disclosed herein. As shown, the voice server 100 can include a core processor 105, one or more core clients 110 and accompanying voice services 115, speech resources 120, and network stacks 125 and 130. Communications between the various components of the voice server 100 can be facilitated through a suitable packet-based network communications protocol such as Transmission Control Protocol/Internet Protocol (TCP/IP).

The core processor 105 can communicate with and coordinate the operation of the various components of the voice server 100. The core processor 105 can process telephony signaling information for calls, perform lookup functions to determine services associated with received calls, as well as allocate resources required for processing a telephone call. For example, the core processor 105 can identify available core clients 110 for processing a telephone call as well as allocate speech processing resources.

Although the core processor 105 can receive telephony signaling information, audio or speech data for calls is not routed through the core processor 105. The core processor 105 does, however, include lookup services for querying data stores to determine telephony related information for a caller or call. Generally, lookup services enable communications over a network. As such, the core processor 105 can use a lookup protocol to obtain information regarding remote programs or machines and use that information to establish a communications link.

Each of the core clients 110 can serve as an interface between the core processor 105 and a voice service 115. One core client 110 can be allocated per voice service 115. The core clients 110 can store call models for both incoming and outgoing calls. The core clients can fetch and execute voice services as required for processing a given call. According to one embodiment of the invention, the core clients 110 can include virtual machines. Alternatively, the core clients 110 can be associated with or instantiate one or more virtual machines, such as voice browsers, in which the voice services can be executed. The voice service 115, upon execution, can provide interactive access to a caller as well as interface with any enterprise applications as may be required. Notably, the voice service 115, once executing, can interact with the core processor 105 via the core client 110 to instruct the core processor 105 as to where to route the speech data for telephone calls. The core client 110 can include a defined application programming interface (API) which facilitates communication between the voice services 115 and the core client 110.

The speech processing resources 120 of the voice server 100 can include speech recognition systems 135 and 140 as well as text-to-speech (TTS) systems 145 and 150. The speech recognition systems 135 and 140 can convert received speech to text. The TTS systems 145 and 150 can convert text to speech to be played to a caller. The speech recognition system 135 and the TTS system 145 can be incorporated into or provided as part of the voice server 100, while the speech recognition system 140 and the TTS system 150 can be third-party systems which can be added to or work cooperatively with the voice server 100.

The voice sewer 100 can be communicatively linked to a circuit-switched telecommunications network via a gateway 155 which serves as an interface between the telecommunications network and packet-switched network. More particularly, the gateway 155 can receive telephony information including telephony signaling information and audio or speech information over T1 links, integrated services digital network (ISDN) links, and/or channel associated signaling (CAS) links. The gateway 155 can separate telephony signaling information from the speech and/or audio data, as well as combine the two for transmission over the telecommunications network. Audio information for received calls can be converted to one or more streams of audio formatted in a suitable protocol such as Real-Time Transport Protocol. Similarly, one or more channels of streamed audio can be received in the gateway 155 and format converted for transmission over the telecommunications network.

The telephony signaling information can be converted from a circuit-switched format to a packet-switched format and placed on an appropriate stack conforming to one of multiple supported communications protocols. For example, received signaling information can be placed on the stack 125 conforming to an H.323 stack or the stack 130 conforming to a Session Initiation Protocol (SIP) stack. Notably, both stacks 125 and 130 can be implemented as Java stacks. The consolidator 160 can serve as an interface between any protocol stacks and the core processor 105. Accordingly, through the consolidator 160, the core processor 105 can receive or read telephony signaling information from the stacks 125 and 130 as well as write telephony signaling information back to the stacks 125 and 130.

In operation, the gateway 155 can receive an inbound call. As mentioned, the telephony signaling information can be separated from the audio information. Accordingly, the gateway 155 can format the received telephony signaling information for use with a packet-switched network and place the telephony signaling information on an appropriate stack such as the H.323 stack or the SIP stack. The consolidator 160 can take events from the stacks 125 and 130 and provide the telephony signaling information to the core processor 105 via a TCP/IP connection.

Audio information from the inbound call can be format converted by the gateway 155 into a channel of streamed audio which can be routed to the real time streaming (RTS)

engine 165. The real time streaming engine 165 can coordinate one or more channels of streaming audio, synchronize the channels, as well as link one or more of the streaming audio channels to the speech recognition system 135 or 140 for conversion to text.

The core processor 105, having received the telephony signaling information for the inbound call can perform one or more functions. As the telephony signaling information can specify the called number and the calling number, the core processor 105 can query the data store 170 and/or 175 to determine one or more voice services to be implemented as well as any voice server resources 120 that may be required to process the call. The data stores 170 and 175 can include associations of telephony signaling data and voice services, references to voice services, as well as a listing of voice server resources required to implement the voice services. As shown in FIG. 1, the core processor 105 can query the data store 170 directly or can query the data stores via an appropriate interface such as API 180 and/or 185.

The core processor 105, having determined one or more voice services 115 to be executed for processing the inbound call, can allocate the necessary voice server resources 120. For example, the core processor 105 can identify an idle core client 110 which is not being used by a voice service 115. The core processor 105 can pass the identified core client 115 the called number, the calling number, information describing the resources which have been allocated for processing the inbound call, as well as the services which are associated with the call.

The core client 110 can fetch the designated voice services, for example from another data store or an application server, and execute the voice service. The voice service determines whether the call will be accepted. If so, the voice service signals the core processor 105, via the core client 110, to accept the call and to route the voice channel to the appropriate speech processing device. Audio received via the inbound call can be processed by the speech recognition system 135 and can be routed to the voice service 115 as text strings. The speech recognition systems 135 and 140 can communicate with the core processor 105 and the core clients 110 via the speech recognition system API 180 as shown. Notably, the speech recognition system 135, being integrated into the voice server 100, can include an additional interface, such as an application toolkit providing further functionality for the speech recognition system 135.

The voice service 115 also can send text, whether generated by the voice service or obtained from another enterprise application, to the TTS system 145. Similar to the speech recognition systems, the core processor 105 and the core client 110 can communicate with the TTS system 145 via the TTS API 185. Additionally, as the TTS system 145 is integrated into the voice server 100, the TTS system 145 can include an additional interface, such as an application toolkit providing further functionality for the TTS system 145. Accordingly, text which is converted to speech via the TTS system 145 and/or 150, can be provided to the RTS engine 190. The RTS engine 190 can receive speech from the TTS systems 145 and 150, and convert the received audio into one or more channels of streamed audio. As was the case with the RTS Engine 165, the RTS engine 190 can coordinate one or more channels of streaming audio, synchronize the channels, and provide the streaming audio channels to the gateway 155.

The gateway 155 can receive the streaming audio channels and convert the audio into a format suitable for transmission over the telecommunications network. Notably, the audio can be routed according to telephony signaling information provided to the gateway 155 by the core processor 105 via the consolidator 160 and the stacks 125 and 130.

Figure 2:
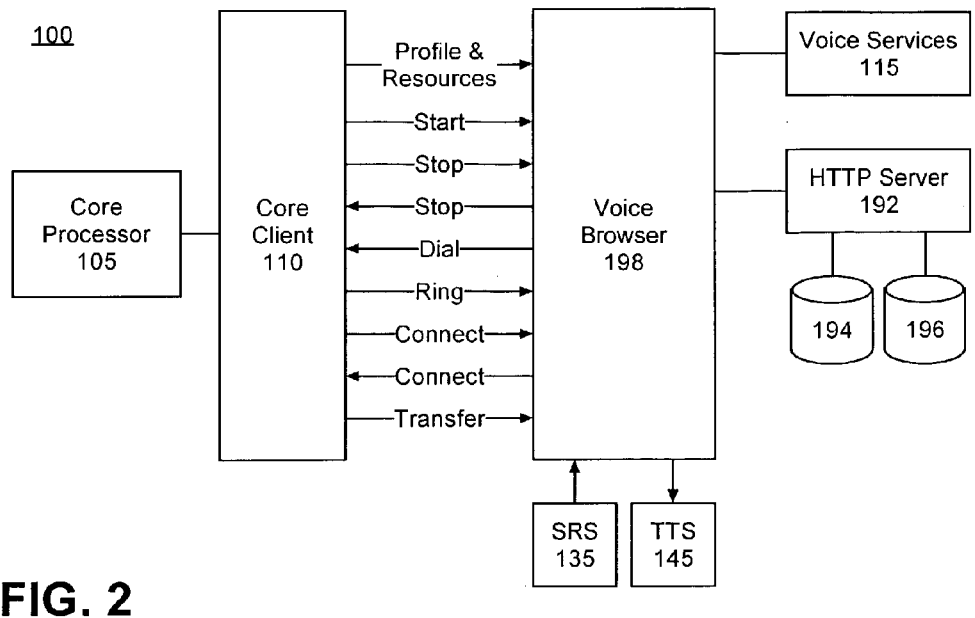
FIG. 2 is a schematic diagram illustrating another embodiment of the voice server of FIG. 1.

FIG. 2 is a schematic diagram illustrating another embodiment of the voice server 100 of FIG. 1. As shown, FIG. 2 depicts a simplified view of the voice server 100 wherein the core processor 105 is in communication with the core client 110. The core client 110 can be in communication with one or more voice browsers such as voice browser 198. Accordingly, the core client 110 can forward profile and resource information to facilitate the retrieval of one or more voice services through the voice browser 198. The profile and resource information can include, but is not limited to, the calling number, the called number, the number of subscribed voice services for the call, the uniform resource locators (URLs) to the voice services, whether speech recognition is required, whether TTS processing is required, as well as references to access the TTS and/or the speech recognition systems. Also shown in FIG. 2 are exemplary message flows between the core client 110 and the voice browser 198 which CAN execute the voice service. Accordingly, the core client 110 can include a defined API for communicating with the voice browser 198.

The voice services to be executed to process an inbound call or initiate an outbound call can be retrieved from the Hypertext Transfer Protocol (HTTP) server 192 from the data store 194. The data store 194 can include a plurality of voice services which can be implemented in Voice Extensible Markup Language (VoiceXML), Java, Java Server Pages, Enterprise JavaBeans™ (EJB), Servlets, and other types of scripts and/or application programs. According to one embodiment of the present invention, the voice services can be stored using Java Archive file format. Data store 196 can include any required audio clips or segments for use with the voice processing services. Notably, the voice browser 198 can establish secure HTTP connections with the HTTP server 192 using secured socket layer (SSL).

During operation, the voice service 115, which is retrieved from the HTTP server 192 from the data store 194, can send text or application text to the TTS system 145 for conversion to speech which can be routed to a caller over an established telecommunications link. Speech or other audio signals such as dual tone multi-frequency signals received over the established telecommunications link can be recognized and/or processed in the speech recognition system 135. The resulting textual representation of the processed audio can be routed or sent to the appropriate voice service 115. As noted, communications between the voice processing resources and the voice services can be facilitated through a packet-switched data link using, for example TCP/IP.

Figure 3:
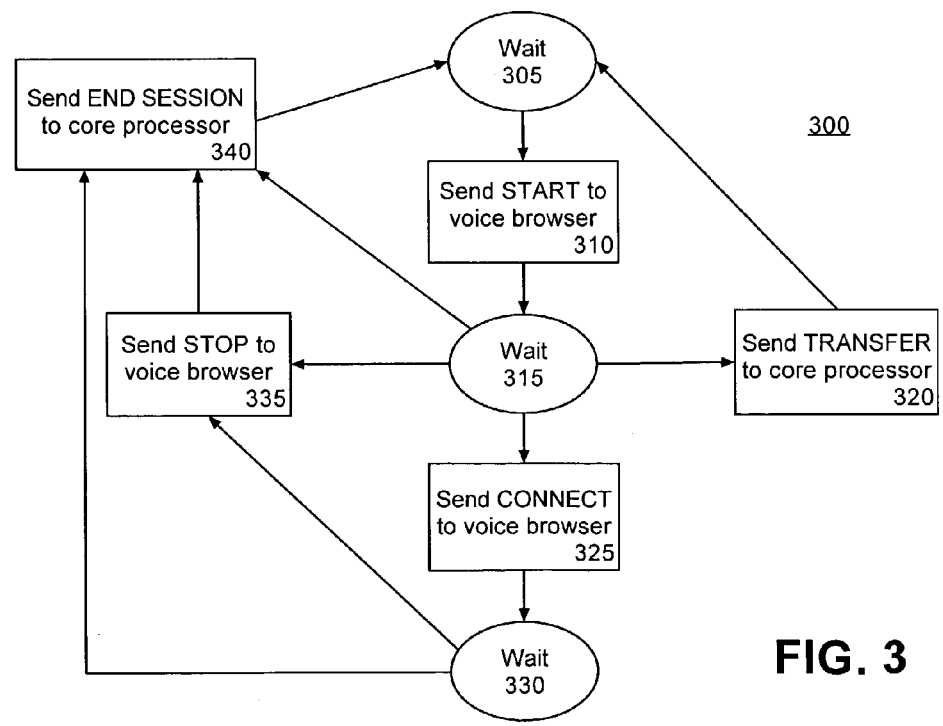
FIG. 3 is a flow chart illustrating an exemplary inbound call model which can be disposed within the core clients of the voice server of FIG. 1.

FIG. 3 is a flow chart illustrating an exemplary inbound call model 300 which can be disposed within and followed by the core clients of the voice server of FIG. 1. The inbound call model 300 can begin in a wait state 305. Responsive to receiving a "SETUP" command from the core processor, the call model can proceed to state 310 where a "START" command can be sent to the voice browser. The call model again can enter a wait state 315. If the core client receives a "TRANSFER" command from the voice browser, for example as a result of executing the voice service, the call model can proceed to state 320, where the core client can send a "TRAN" or transfer command to the core processor. The transfer command, both from the voice browser and to the core processor, can specify any necessary call routing information as determined by the voice service. After state 320, the call model can proceed to wait state 305.

If in wait state 315, a "CONNECT" command is received from the voice browser, the call model can proceed to state 325 where a "CONN" or connect command can be sent to the core processor. After state 325, the call model can proceed to wait state 330. If in wait state 330 a "STOP" command is received from the voice browser, the call model can proceed to state 340 where an "END SESSION" command is sent to the core processor. After state 340, the call model can proceed to wait state 305.

If in wait state 330 an "END SESSION" command is received from the core processor, the call model can proceed to state 335, where a "STOP" command is sent to the voice browser. After state 335, the call model can proceed to state 340 and then to wait state 305. If in wait state 315 an "END SESSION" or "TIMEOUT" command is received from the core processor, the call model can proceed to state 335 where a "STOP" command can be sent to the voice browser. The call model can proceed accordingly. If in wait state 315 a "STOP" command is received from the voice browser, however, the call model can proceed to state 340 where an "END SESSION" command can be sent to the core processor. The call model can proceed accordingly to wait state 305.

Figure 4:
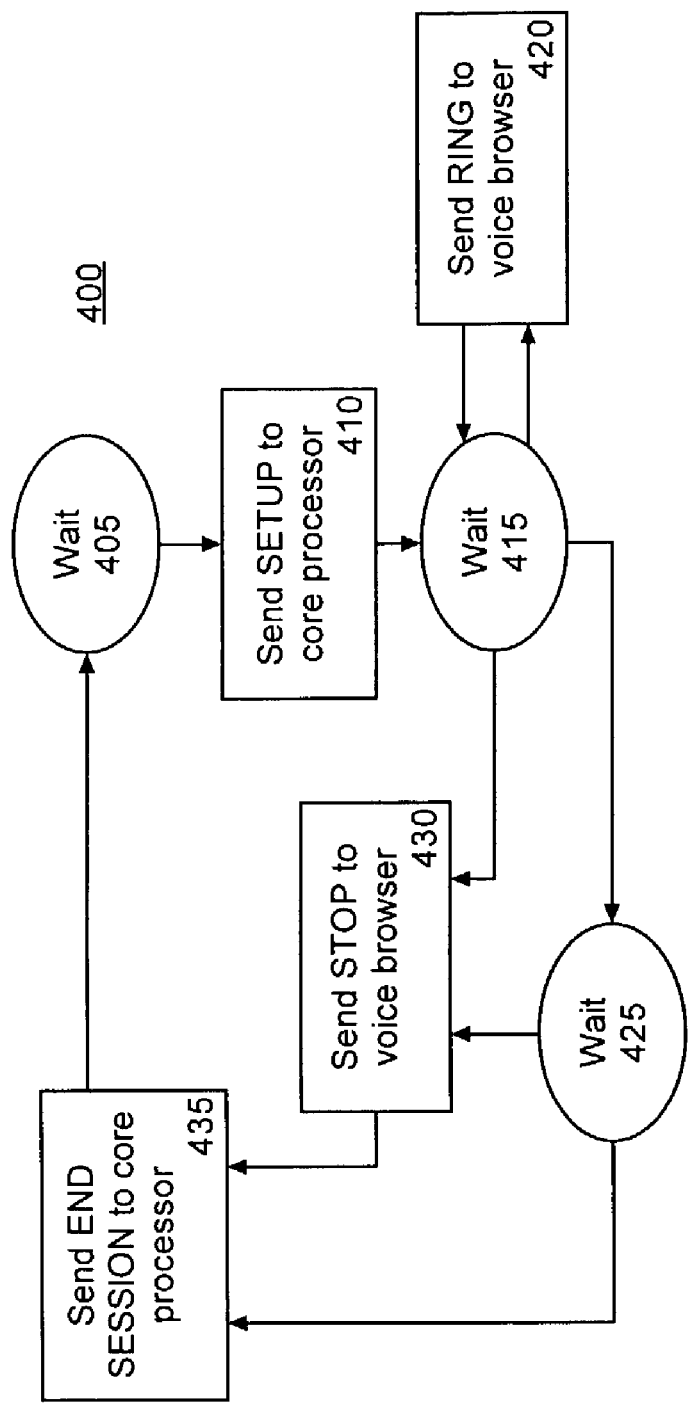
FIG. 4 is a flow chart illustrating an exemplary outbound call model which can be disposed within the core clients of the voice server of FIG. 1.

FIG. 4 is a flow chart illustrating an exemplary outbound call model 400 which can be disposed within and followed by the core clients of the voice server of FIG. 1.

The outbound call model can begin in wait state 405. If a "DIAL" command is received from the voice browser during execution of a voice service, the call model can proceed to state 410 where a "SETUP" command can be sent to the core processor. After state 410, the call model can proceed to wait state 415. In wait state 415, if an "ALERT" is received from the core processor, then a "RING" command can be sent to the voice browser in state 420. After state 420, the call model can return to wait state 415.

If in wait state 415, a "CONN" or connect is received from the core processor, the call model can proceed to wait state 425. The call model can remain in wait state 425 until a "STOP" command is received from the voice browser or an "END SESSION" command is received from the core processor. If a "STOP" command is received from the voice browser, the call model can proceed to state 435 where an "END SESSION" command can be sent to the core processor. The call model then can return to wait state 405. If, however, an "END SESSION" command is received from the core processor when in wait state 425, then the call model can proceed to state 430 where a "STOP" command can be sent to the voice browser. The call model then can proceed to state 435 where an "END SESSION" command can be sent to the core processor. The call model then can return to wait state 405.

If in wait state 415 a "TIMEOUT" or an "END SESSION" command is received from the core processor, the call model can proceed to state 430 where a "STOP" command can be sent to the voice browser. The call model then can proceed to state 435 and eventually return to wait state 405.

In the Appendix, several call processing conditions or scenarios have been illustrated which depict exemplary message flows between the various components of the voice server and the telecommunications network. For example, the Appendix illustrates message flows for the following call scenarios: a failed outbound call, an inbound call that is terminated locally, an inbound call that is terminated externally, an inbound call that is transferred, an inbound call that is rejected, an outbound call that is terminated locally, and an outbound call that is terminated externally.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

APPENDIX
A. Outbound call failed.
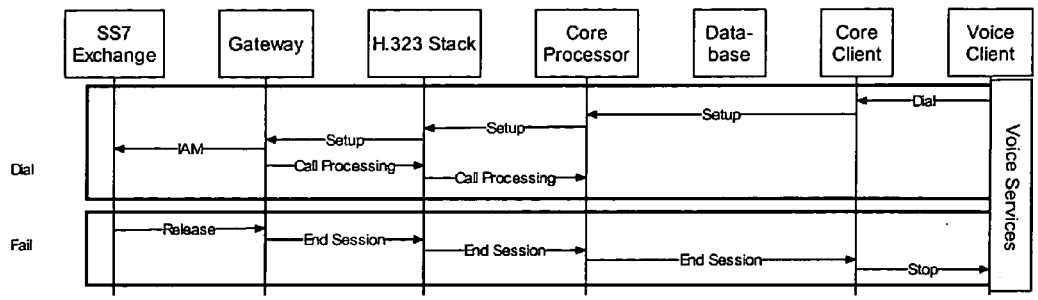
B. Inbound call (local termination).
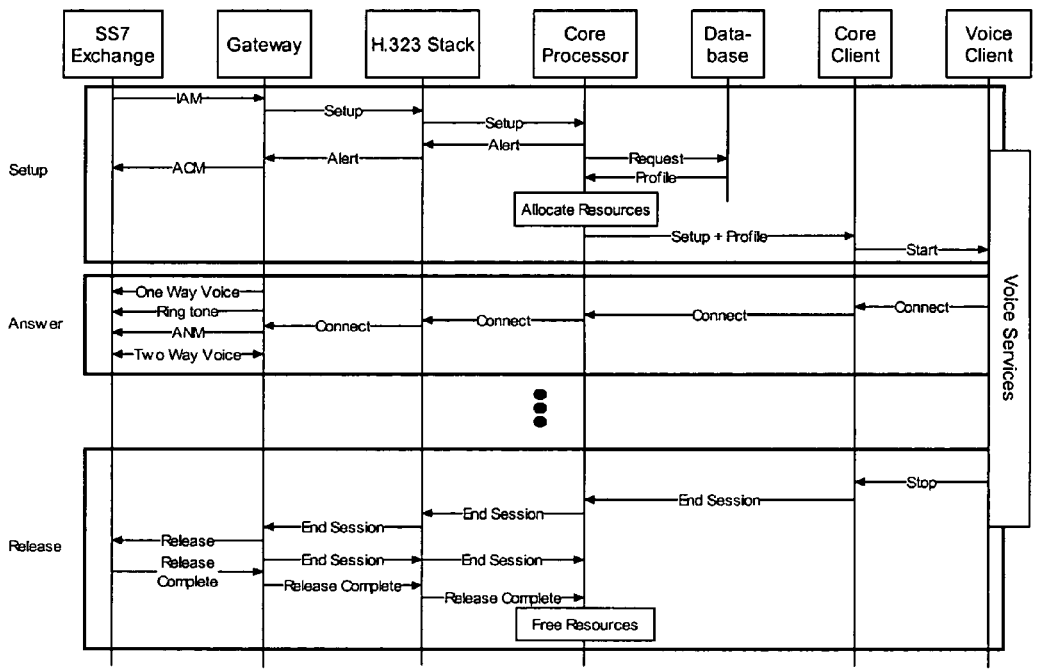

C. Inbound call (external termination).
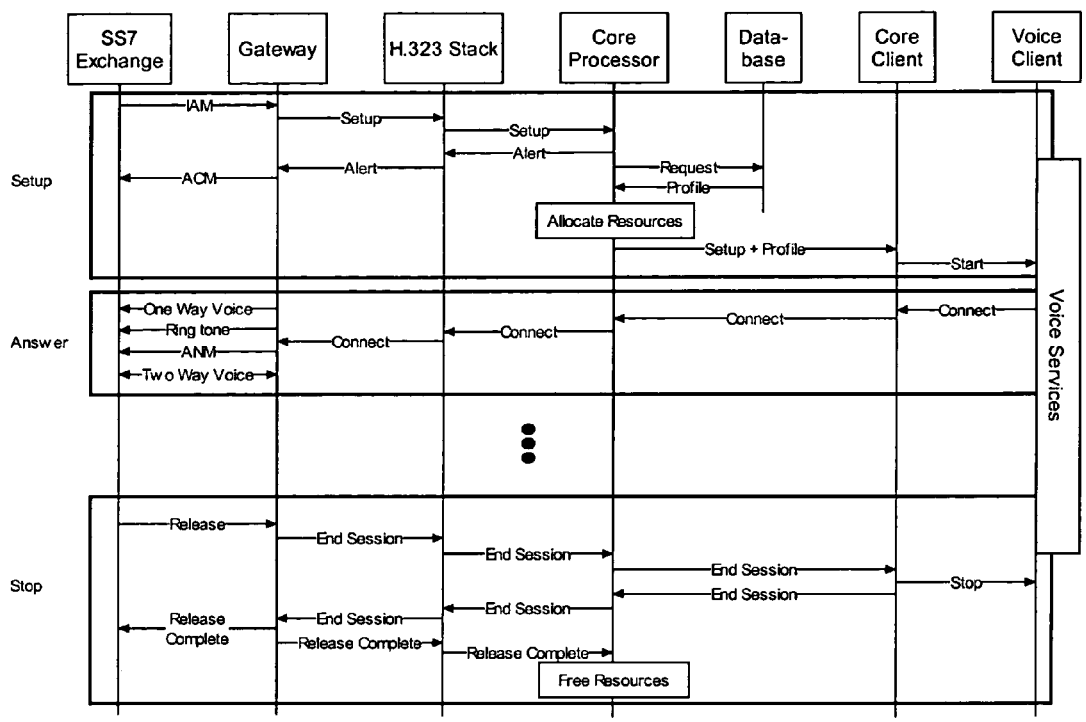

D. Inbound call transfer.
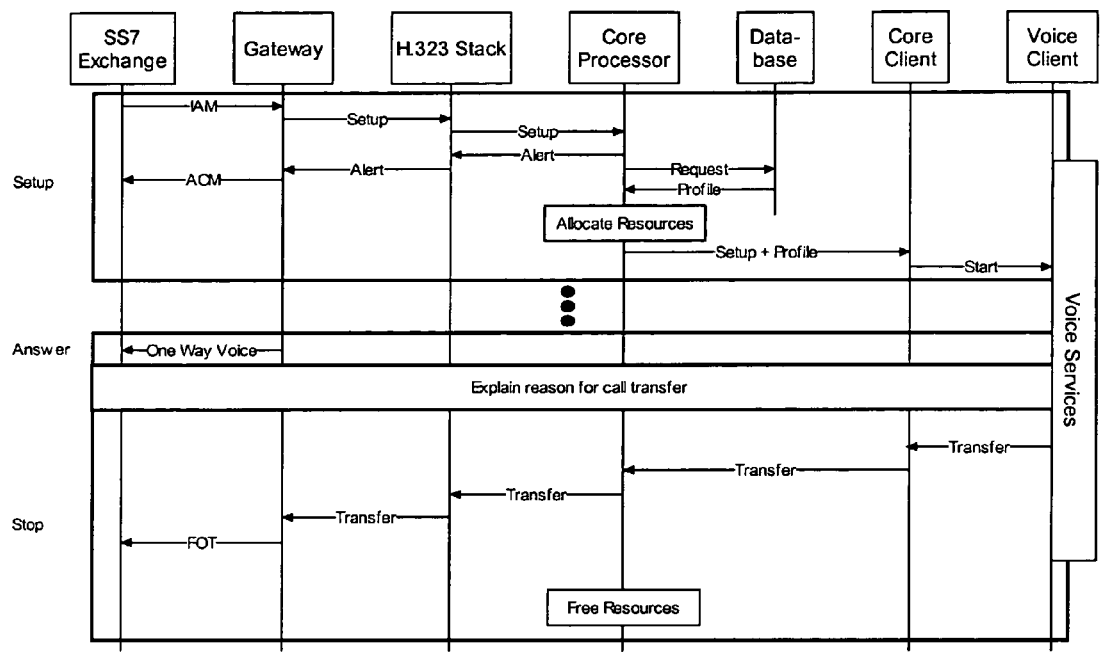

E. Inbound call reject.
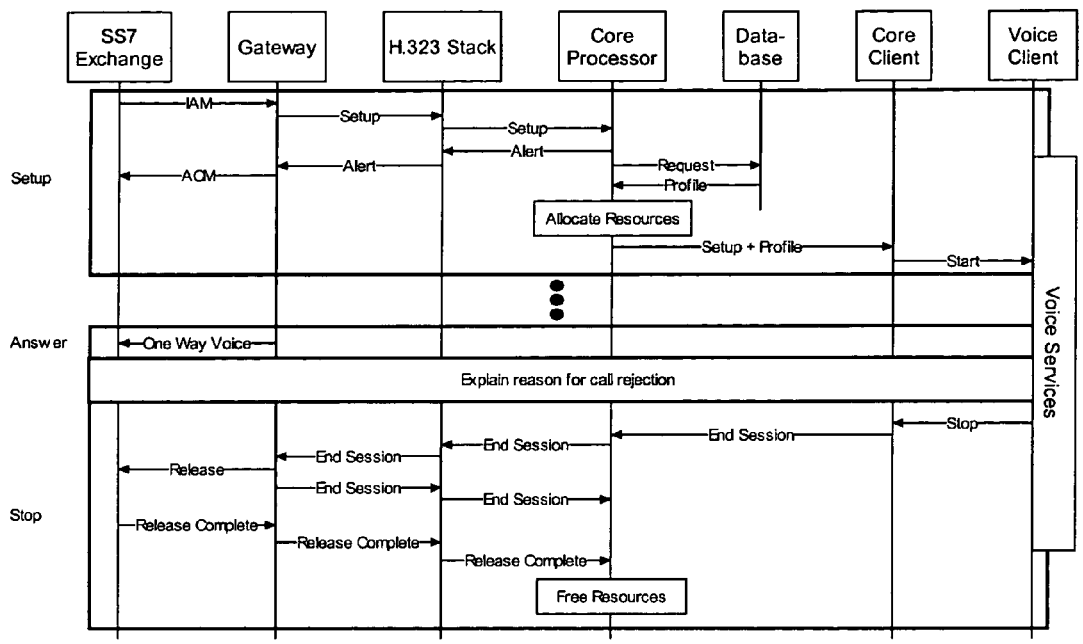
F. Outbound call (local termination).
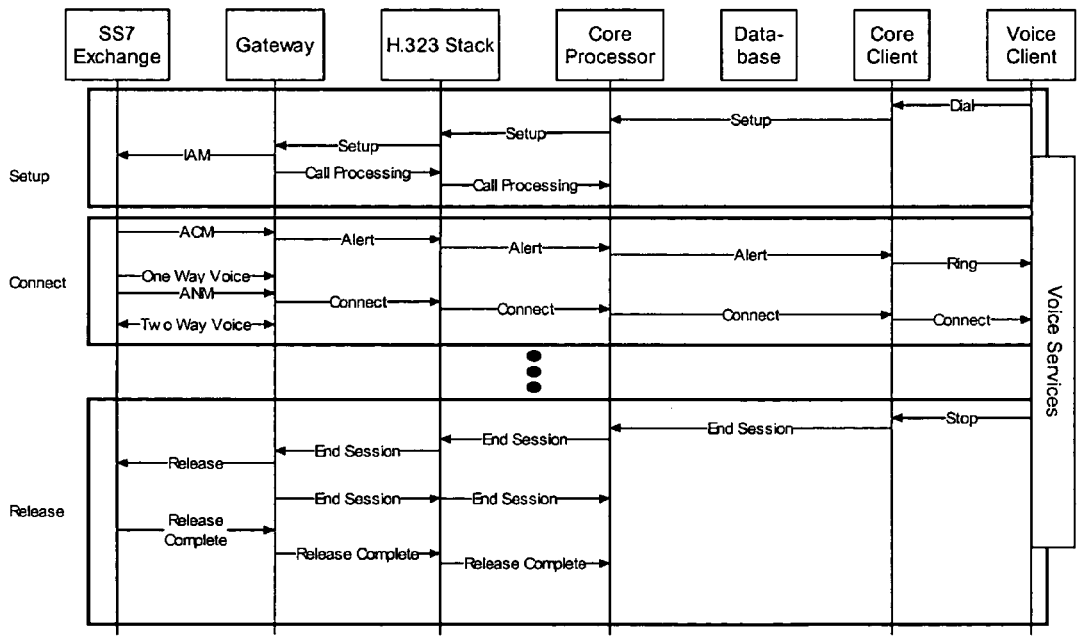

G. Outbound call (external termination).
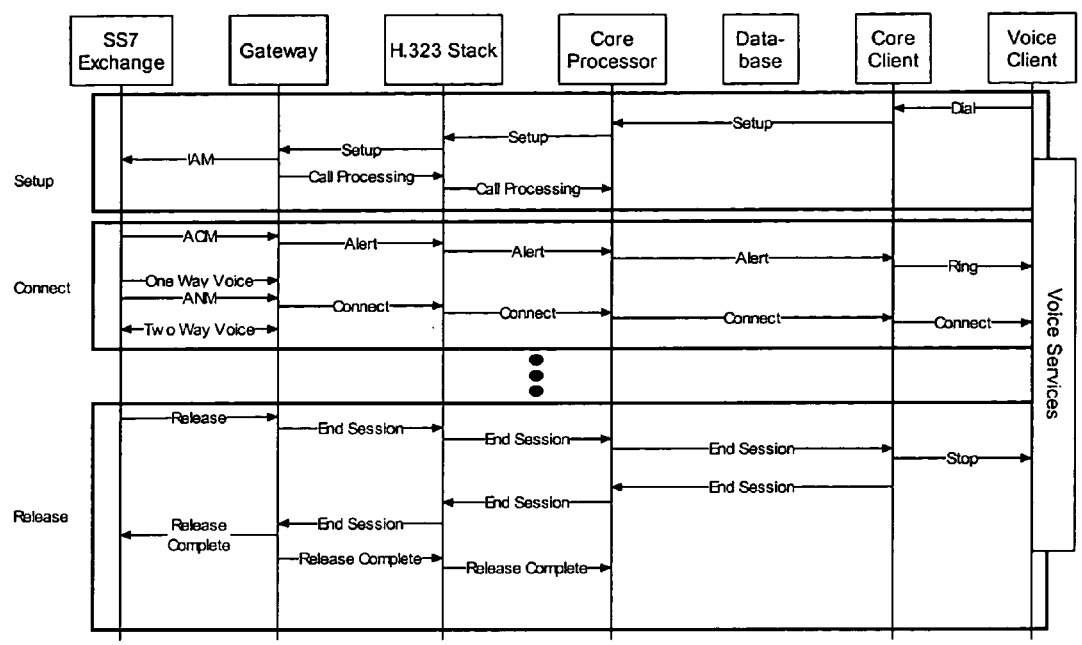

What is claimed is:

1. A voice server for hosting telephony services comprising:
   a gateway for processing a telephone call, wherein said gateway:
      separates inbound telephony signaling events from audio information, and
      combines outbound telephony signaling events with audio information;
   a real-time streaming engine, wherein said engine:
      sends inbound audio data to a speech recognition engine for converting said audio information to text, and
      receives outbound audio data from a text-to-speech system that synthesizes said audio information from text;
   a stack interface configured to exchange telephony signaling information on a stack with one of a circuit-switched to packet-switched interface coupled to said gateway;
   a consolidation processor for sending and receiving telephony signaling events on said stack to a core processor, wherein said core processor directs said audio information to one or more speech processing systems and one or more core clients in response to said telephony signaling events;
   a plurality of core clients, each having a call model stored therein, wherein each said core client is configured to select and execute at least one voice service associated with a call, wherein said core client processes text, said text representing said audio information that is communicated to and from said voice service;
   a speech processing system containing said speech recognition engine and said text-to-speech engine configured to convert speech to text and to convert text to speech for processing said call; and
   a core processor configured to distribute said telephony signaling information to said core clients and coordinate operation of said core clients and said speech processing system based on a bandwidth capacity of said core processor, wherein said core processor exchanges telephony signaling information with said circuit-switched to packet-switched interface via said stack interface.

2. The voice server of claim 1, wherein audio information within said voice server is routed to and from said speech processing system without being provided to said core processor or said core clients.

3. The voice server of claim 1, wherein said core processor is configured to perform lookup services.

4. The voice server of claim 1, wherein said core clients, said speech processing system, and said core processor communicate via a packet-switched communications network.

5. The voice server of claim 1, further comprising:
   an application programming interface to said speech processing system through which said core processor interacts with said speech processing system and through which said speech processing system exchanges said text with said at least one voice service via said core clients.

6. The voice server of claim 1, wherein said speech processing system is configured to process dual tone multi-frequency signals.

7. The voice server of claim 1, further comprising:
   an application programming interface through which said core processor interacts with said speech recognition system and through which said speech recognition system exchanges said text with said at least one voice service via said core clients; and
   an application programming interface through which said core processor interacts with said text-to-speech system and through which said text-to-speech system exchanges said text with said at least one voice service via said core clients.

8. The voice server of claim 1, further comprising:
   at least one real-time streaming engine configured to convert audio data between a streamed audio format and a packetized data format for exchanging said audio data between said speech processing system and said circuit-switched to packet-switched interface.

9. The voice server of claim 1, wherein said real-time streaming engine is configured to either:
   convert streamed audio from said circuit-switched to packet-switched interface to packetized data to be provided to said speech recognition system; and
   convert packetized data from said text-to-speech system to streamed audio to be provided to said circuit-switched to packet-switched interface.

10. The voice server of claim 1, further comprising:
    a data store which associates voice services with said telephony signaling information, wherein each association of said telephony signaling information with a voice service further specifies voice server resources required for implementing said voice service.

11. The voice server of claim 10, wherein said telephony signaling information specifies at least a called number and a calling number such that said core processor can access said data store to determine at least one voice service associated with said call and resources associated with said at least one voice service.

12. The voice server of claim 11, wherein said core processor determines an available one of said core clients and provides said called number, said calling number, said determined voice services, and said determined voice server resources, each associated with said call, to said available one of said core clients.

13. The voice server of claim 1, further comprising:
    a plurality of stack interfaces for exchanging telephony signaling information, wherein each one of said stack interfaces is dedicated to a particular telephony protocol.

14. The voice server of claim 13, wherein said
    consolidation processor is configured to read telephony signaling information from each of said stack interfaces and provide said telephony signaling information to said core processor, and to receive telephony signaling information from said core processor and distribute said telephony signaling information to an appropriate one of said stack interfaces.

15. The voice server of claim 1, said core clients comprising:
    an application programming interface for communicating with said at least one voice service using just text, wherein each said core client is associated with a virtual machine within which said at least one voice service executes.

16. The voice server of claim 1, wherein said call model comprises an inbound call model and an outbound call model.

17. A method of processing calls within a voice server, comprising:
    identifying, within a core processor of said voice server, telephony signaling information for a call by separating audio information of said call from telephony signaling information;

if said call is inbound, formatting said audio information as streaming audio and providing said streaming audio to a speech processing system to convert said audio information to a text to be communicated to a voice service, if said call is outbound, receiving a text from said voice service, providing said text to a speech processing system to convert said text to speech, and formatting said speech as streaming audio for playback over said call;

said core processor performing a lookup function associated with said telephony signaling information based on a bandwidth capacity of said core processor to determine voice services for processing said call using textual information;

providing said telephony signaling information to a core client within said voice server, wherein said core client has a call model stored therein;

said core client using said received telephony signaling information to retrieve a voice service associated with said call;

said core client exchanging textual information with a speech processing system such that said core client does not receive or process an audio channel; and said core client executing said voice service to process said call according to said executing voice service and said call model.

18. The method of claim 17, further comprising:
receiving said call within a circuit switched to packet switched telephony interface.

19. The method of claim 18, further comprising:
placing said telephony signaling information to be provided to said core processor on a telephony stack.

20. The method of claim 18, further comprising:
placing said telephony signaling information to be provided to said core processor on at least one of a plurality of telephony stacks, wherein each one of said telephony stacks corresponds to a particular messaging protocol; and
selectively providing telephony signaling information from one of said telephony stacks to said core processor.

21. The method of claim 18, further comprising:
providing said streaming audio to said circuit switched to a packet switched telephony interface for playback over said call.

22. A method of processing calls within a voice server comprising:
executing a telephony voice service;
within said voice server, said voice server having a core processor and a plurality of core clients operatively coordinated by said core processor, identifying a call over an established telecommunications link and a bandwidth capacity of said core processor;
separating telephony signaling events from audio of said call and placing said telephony signaling events on a stack;
directing said audio to one or more speech processing systems and one or more core clients in response to processing said telephony signaling events on said stack,
routing said audio to a speech recognition engine for conversion to speech recognized text;
providing said speech recognized text to said telephony voice service for processing in accordance with said telephony signaling events and said capacity;
said telephony voice service determining playback text such that audio is not processed by said telephony voice service;

providing said playback text to a text-to-speech engine for producing playback audio; and combining telephony signaling events on said stack with said playback audio for sending playback audio over said telecommunications link.

23. A machine-readable storage medium, having stored thereon a computer program comprising computer instructions for:

identifying, within a core processor of said voice server, telephony signaling information for a call by separating audio information of said call from telephony signaling information;

if said call is inbound, formatting said audio information as streaming audio and providing said streaming audio to a speech processing system to convert said audio information to a text to be communicated to a voice service, if said call is outbound, receiving a text from said voice service, providing said text to a speech processing system to convert said text to speech, and formatting said speech as streaming audio for playback over said call;

said core processor performing a lookup function associated with said telephony signaling information to determine voice services for processing said call using textual information based on a bandwidth capacity of said core processor;

providing said telephony signaling information to a core client within said voice server, wherein said core client has a call model stored therein;

said core client using said received telephony signaling information to retrieve a voice service associated with said call;

said core client exchanging textual information with a speech processing system such that said core client does not receive or process an audio channel; and said core client executing said voice service to process said call according to said executing voice service and said call model.

24. The machine-readable storage of claim 23, further comprising:
receiving said call within a circuit switched to packet switched telephony interface.

25. The machine-readable storage of claim 24, further comprising:
placing said telephony signaling information to be provided to said core processor on a telephony stack.

26. The machine-readable storage of claim 24, further comprising:
placing said telephony signaling information to be provided to said core processor on at least one of a plurality of telephony stacks, wherein each one of said telephony stacks corresponds to a particular messaging protocol; and
selectively providing telephony signaling information from one of said telephony stacks to said core processor.

27. The machine-readable storage of claim 24, further comprising:
providing said streaming audio to said circuit switched to packet switched telephony interface for playback over said call.

* * * * *